Patented Jan. 29, 1946

2,393,917

UNITED STATES PATENT OFFICE 2,393,917

MANUFACTURE OF THIOUREA

William F. Lewis, Nitro, W. Va., assignor to Monsanto Chemical Company, St. Louis, Mo., a corporation of Delaware No Drawing. Application April 15, 1942,
Serial No. 439,124

3 Claims. (Cl. 260—552)

The present invention relates to the manufacture of thiourea and more particularly to the manufacture of thiourea from hydrogen sulfide and an alkaline earth cyanamide.

At elevated temperatures an alkaline earth cyanamide reacts rapidly with hydrogen sulfide to produce thiourea, especially in the presence of a large excess of hydrogen sulfide. Experience has shown that for economical operation the hydrogen sulfide must be in substantial stoichiometric excess of the cyanamide in the reaction zone through at least the greater part of the reaction.

In accordance with the present invention optimum conditions for reaction are simply and efficiently brought about by charging the reactor with an aqueous suspension of an alkaline earth hydroxide and absorbing hydrogen sulfide therein prior to initiating any reaction with the cyanamide. In this manner hydrogen sulfide is stored in solution in the form of an alkaline earth metal hydrosulfide which solution can be heated to the proper temperature for reaction without serious loss of hydrogen sulfide thus obviating the necessity for pressure equipment. In this connection it seems not to have been generally appreciated that alkaline earth hydrosulfides react with a cayanamide fully as rapidly and completely as free hydrogen sulfide.

After building up the initial excess of hydrogen sulfide by absorption in an alkaline earth hydroxide the desired excess can be maintained by continuing the addition of hydrogen sulfide along with the cyanamide. It may be pointed out that alkaline earth hydroxide is formed as a by-product of the reaction as appears from the equation:

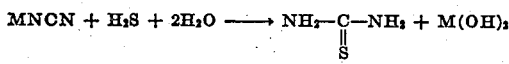

where M is an alkaline earth metal. This fact permits the use of lower amounts of absorbent than would otherwise be required. However, if desired, the alkaline earth hydroxide, as for example lime, can be added sufficient to absorb all of the hydrogen sulfide subsequently needed. The amounts can be widely varied and even a large excess is not detrimental except that it increases the amount of material which must be subsequently filtered and handled. The alkaline earth hydroxides are in general gelatinous and slimy and hence difficult to filter so that it is recommended prior to any filtering operation that hydrogen sulfide be added sufficient to combine with all of the absorbent. If an excess over the amount required for reaction with the cyanamide is present it can be used up in subsequent operations. In practice it has been found that approximately two-thirds of the alkali metal hydroxide necessary to absorb the hydrogen sulfide theoretically required for reaction with the cyanamide is sufficient to meet practical requirements. These proportions are based on the total quantities used in a single operation, it being preferred to saturate the aforementioned quantity of alkali earth hydroxide with hydrogen sulfide before adding any of the cyanamide. Lower amounts of absorbent can be used but with gradually diminishing effectiveness.

The optimum temperature for reaction of the hydrosulfides is the same as that for free hydrogen sulfide, about 80–95° C. Below 100° C. the transfer of thiourea into thiocyanate is negligible. However, it is possible, in fact preferred, to absorb the hydrogen sulfide at a lower temperature as for example 15 to 20°.

A very important advantage of the process of this invention is that it is not affected by reasonable amounts of impurities, notably sulfur compounds, frequently found in hydrogen sulfide. It is probable that the alkaline earth hydroxides react chemically with the impurities as well as with the hydrogen sulfide, whereas of the reaction products formed only the latter reacts with the cyanamide. On the other hand the free impurities as well as free hydrogen sulfide react with the cyanamide. However, the present invention is not limited to any theory or explanation of the observed facts.

As a specific embodiment of the invention which is illustrative thereof but in nowise limitative, about 1250 pounds of water and 150 pounds of hydrated lime are charged into an iron reactor of suitable capacity. Gaseous hydrogen sulfide is then fed in at 30°–50° C. until 77.6 pounds had been absorbed. The charge is then heated to 80° C. and 200 pounds of crude 60% calcium cyanamide added. The addition of hydrogen sulfide is then continued while another 200 pounds of calcium cyanamide are added. Approximately 82 pounds of hydrogen sulfide are run in during the addition of the second 200 pounds of calcium cyanamide. Preferably the reaction charge is filtered at this point in order to avoid handling excessive amounts of insolubles and the filtrate and washings returned to the reactor and heated to 80°–90° C. The hydrogen sulfide feed is again continued, about 93 pounds being added together with 400 pounds of calcium cyanamide.

The batch is again filtered and the filtrate and washings pumped into a glass lined neutralizing tank and 60% sulfuric acid fed in slowly until the charge is faintly acid (pH 6.6). The temperature is raised to 80° C. and after a short period of heating and stirring the sulfate cake is filtered off and the clear filtrate and washings pumped to the concentrator. Before the separation of the thiourea, however, it is advisable to run the hot concentrated solution through a filter to remove additional small amounts of impurities which frequently separate as the solution is concentrated. Excellent yields of thiourea of high purity are obtained directly from the concentrated solution even from technical hydrogen sulfide containing impurities of sulfur compounds.

The data set forth below show the advantages of the present process. The amounts of lime and hydrogen sulfide as well as the yields are based on the mols of calcium cyanamide available for reaction. The "technincal" hydrogen sulfide contains impurities of sulfur compounds.

| CaO, mols | $H_2S$ | | Thiourea produced |
| --- | --- | --- | --- |
| | Purity | Excess of theory | |
| | | Percent | Percent |
| None | Pure | 50 | 84.7 |
| 0.83 | ----do---- | 5 | 91.2 |
| None | Technical | 50 | 69.8 |
| 0.83 | ----do---- | 5 | 84.7 |
| 0.41 | ----do---- | 5 | 83.0 |
| 0.33 | ----do---- | 16-23 | [1] 90.4 |

[1] Average.

The above data show that the absorption of the hydrogen sulfide in lime increases the yield of thiourea even with an overall excess of only 5% hydrogen sulfide. The results with hydrogen sulfide containing impurities of sulfur compounds are particularly striking and show that the deleterious effect of the impurities can in large measure be overcome by the addition of lime to the reactor charge and can completely be overcome by the addition of lime coupled with an increase in the overall excess of the hydrogen sulfide.

While a preferred form of the improved process has been set forth to illustrate the invention it is to be understood that numerous changes can be made without departing from the principles of the invention. Such deviations will be apparent to those skilled in the art to which this invention pertains. The present invention is limited solely by the claims attached hereto as part of the present specification.

What is claimed is:

1. The method of making thiourea from hydrogen sulfide which comprises converting the hydrogen sulfide to an aqueous solution of alkaline earth hydrosulfide, reacting the alkaline earth hydrosulfide directly with an alkaline earth cyanamide by gradually adding the cyanamide to a hot aqueous solution but below 100° C. of the hydrosulfide and keeping the latter in stoichiometric excess at every point throughout the reaction, the excess being sufficiently large to attain maximum yield with the particular grade of hydrogen sulfide used.

2. In the process of making thiourea from hydrogen sulfide and an alkaline earth cyanamide the steps of absorbing the hydrogen sulfide in aqueous alkaline earth hydroxide sufficient to absorb at least two thirds of the total hydrogen sulfide theoretically required for the complete reaction with all of the alkaline earth cyanamide, then gradually adding cyanamide while heating below 100° C. to initiate a reaction directly with the alkaline earth hydrosulfide formed by reaction of the hydrogen sulfide and alkaline earth hydroxide, and while there is still a large excess of hydrosulfide over that theoretically required by the cyanamide already added, but after the regeneration of part of the alkaline earth hydroxide, gradually forming more hydrosulfide by gradually adding further quantities of hydrogen sulfide along with the cyanamide so as to keep the alkaline earth hydrosulfide in stoichiometric excess at every point throughout the reaction, the excess being sufficiently large to attain maximum yield with the particular grade of hydrogen sulfide used.

3. In the process of making thiourea from hydrogen sulfide and calcium cyanamide the steps of absorbing the hydrogen sulfide in lime water containing sufficient calcium hydroxide to absorb part of the total hydrogen sulfide theoretically required for the complete reaction with all of the calcium cyanamide, then gradually adding calcium cyanamide to the hot solution of calcium hydrosulfide formed by reaction of the hydrogen sulfide and lime the temperature of reaction being about 80-95° C., and while there is still a large excess of calcium hydrosulfide over that theoretically required by the cyanamide already added, but after the regeneration of part of the lime gradually forming more hydrosulfide by the addition of more hydrogen sulfide along with the calcium cyanamide so as to keep the calcium hydrosulfide in stoichiometric excess at every point throughout the reaction, the excess being sufficiently large to attain maximum yield with the particular grade of hydrogen sulfide used.

WILLIAM F. LEWIS.